United States Patent [19]

Bergougnoux et al.

[11] 4,038,135

[45] July 26, 1977

[54] PLATE TYPE NUCLEAR FUEL ELEMENT AND A METHOD OF FABRICATION OF SAID ELEMENT

[75] Inventors: Rene Bergougnoux, Aix-en-Provence; Jacques Delafosse, Gif-sur-Yvette, both of France

[73] Assignee: Commissariat a l'Energie Atomique, Paris, France

[21] Appl. No.: 727,730

[22] Filed: Sept. 29, 1976

Related U.S. Application Data

[63] Continuation of Ser. No. 484,743, July 1, 1974, abandoned.

[30] Foreign Application Priority Data

July 6, 1973 France .................................. 73.24992
Apr. 3, 1974 France .................................. 74.11821

[51] Int. Cl.² .................................................. G21C 3/02
[52] U.S. Cl. ........................................ 176/68; 176/75; 176/77
[58] Field of Search ...................... 176/68, 72, 75, 77, 176/78

[56] References Cited

U.S. PATENT DOCUMENTS

| | | | |
|---|---|---|---|
| 3,067,116 | 12/1962 | Kittel et al. | 176/72 |
| 3,167,482 | 1/1965 | Katz | 176/68 |
| 3,291,700 | 12/1966 | Brossa et al. | 176/72 X |
| 3,297,543 | 1/1967 | Jessen et al. | 176/75 |
| 3,586,744 | 6/1971 | Triggiani et al. | 176/75 X |
| 3,586,745 | 6/1971 | Triggiani et al. | 176/75 X |
| 3,855,061 | 12/1974 | Triggiani et al. | 176/75 |
| 3,923,596 | 12/1975 | Leonard, Jr. | 176/75 |

*Primary Examiner* — Peter A. Nelson
*Attorney, Agent, or Firm* — Sughrue, Rothwell, Mion, Zinn and Macpeak

[57] ABSTRACT

The fuel element comprises a core having a base of ceramic fuel material enclosed between two metallic cladding plates and constituted by the juxtaposed array of a plurality of ceramic fuel wafers. At least a number of wafers are provided with individual metallic protection which performs a contributory function in the cladding of the wafers and in the division of the fuel element into compartments.

14 Claims, 10 Drawing Figures

PLATE TYPE NUCLEAR FUEL ELEMENT AND A METHOD OF FABRICATION OF SAID ELEMENT

This is a continuation of application Ser. No. 484,743, filed July 1, 1974 and now abandoned.

This invention relates to a ceramic nuclear fuel element and to a method of fabrication of said element.

It has already been proposed in the nuclear technique, especially for reactors of the light-water system, to design nuclear fuel in the form of a clad plate unit in which the ceramic fuel material is subdivided and placed within compartments which are isolated from each other by partitions made of metallic material, the intended function of said partitions being to ensure that the fuel compartments afford a certain degree of leak-tightness with respect to each other.

The use of a fuel structure of this type in nuclear power plants and especially light-water plants considerably improves the resistance of the fuel to power cycling, the behavior of the fuel in the event of stoppage of the cooling system, the reliability of the cladding and the safety features of the nuclear power plant.

The above-mentioned structure of the compartment type in fact improves heat-transfer processes between the fuel core and the cladding by virtue of the partitions which isolate the compartments since said partitions constitute paths for the flow of heat from each fuel compartment towards the fuel element cladding. As a consequence, in the case of an identical coolant outlet temperature, the temperature at the center of the fuel element is maintained at a lower value than that of fuels which are not divided into compartments, this being achieved both by virtue of the small thickness of the fuel wafers and by virtue of the division into compartments. In the case of zirconium-clad fuel having a uranium oxide base, the maintenance of a lower temperature improves the behavior of the fuel under irradiation. Since differential expansions between the fuel and the cladding are of lower magnitude, there is a much slower development of potential fault conditions. Similarly, in the event of accidental stoppage of the cooling system, re-wetting by means of injected emergency water is facilitated since the equilibrium temperature of oxide and cladding is considerably lower and there is less danger of any zirconium-water reaction.

Furthermore, at the time of failure of a fuel element cladding, the quantity of fission products released into the coolant is much smaller since it is limited to the contents of a single compartment of the fuel element.

Unfortunately, it has not proved possible up to the present time to make full use of the advantages which have been described in the foregoing and which are normally expected in this technique. The reasons for this lie primarily in the imperfections of the technology which has been employed hitherto.

In the first place, the plate-type fuel elements fabricated up to the present time have not permitted wholly leak-tight partitioning during operation in the case of the different fuel compartments, with the result that the advantages of this structure are considerably reduced in the event of a failure of the cladding.

In the second place, the method of fabrication of plate-type elements is relatively difficult in practice. One known technique for constructing clad fuel plate units divided into compartments in fact consists in inserting between two metallic cladding plates a perforated metallic plate in which the perforations have been filled with powdered nuclear fuel.

The fabrication of the fuel core proper therefore calls for machining of the metallic plate in order to obtain the perforations prior to the filling of these latter with nuclear fuel.

The assembly of the fuel core and the cladding plates is then performed by welding, rolling or hot compression.

The precise aim of this invention is to provide a novel plate-type ceramic fuel element which offers much greater safety than the structures of the prior art from the viewpoint of in-pile behavior and which entails a much simpler method of manufacture since it does not require costly intermediate machining operations. By means of a single heat treatment under pressure, it is in fact possible by means of this method and starting from a fuel core formed by previously fabricated and juxtaposed elements to form a cladding on the fuel element and at the same time to form a perfect metallurgical bond between the partitions of each fuel compartment.

To this end, the plate-type nuclear fuel element in accordance with the invention comprises a core having a base of ceramic fuel material enclosed between two metallic cladding plates and is distinguished by the fact that the fuel core is constituted by the juxtaposed array of a plurality of wafers of ceramic fuel material, at least a number of said wafers being provided with an individual metallic protection which has a contributory function in the cladding of the wafers and in the division of the fuel element into compartments.

It is therefore apparent that in accordance with this essential feature of the invention, the division of the fuel into compartments as mentioned earlier is achieved by means of the individual and independent metallic protection or cladding components of each fuel wafer and that these latter are conducive to the advantageous performances of this type of fuel element. Moreover, not all the fuel wafers need necessarily be provided with an individual protection in order to obtain this result. Thus it is only necessary to ensure that one unprotected wafer is surrounded within the plate element by four wafers which are provided with this type of protection.

In accordance with the invention, the individual metallic protection of the fuel wafers can be carried out in a number of different ways.

In a first mode of execution of the invention, each fuel wafer is wholly covered with a sheet of thin metallic foil which serves as a wrapper for said wafer and is formed especially of zirconium or a zirconium alloy. In some cases, the ceramic nuclear fuel wafers are advantageously covered with a layer of graphite before being wrapped in the thin sheet of metallic foil.

In a variant of the mode of execution aforesaid, metallic partition-strips are interposed between the covered fuel wafers in such a manner as to ensure that two adjacent wafers are separated by the whole or a part of a metallic partition-strip.

In a second mode of execution, the individual metallic protection of each wafer of ceramic fuel material is provided laterally by means of a thin metallic strip which is placed as a hoop around said wafer. One of the advantages offered by this second mode of execution lies in the fact that it dispenses with the need to provide a system of guide strips for setting the fuel wafers in rows between the two cladding plates prior to diffusion bonding since the lateral metallic protection of said wafers endows these latter with a sufficient degree of strength and independence to make it possible simply to align them side by side.

In this mode of execution, a preferred embodiment of the invention consists in forming the fuel plates by means of a single row of unitary wafers. This accordingly makes it possible to form narrow fuel-plate units of substantial length which are maintained in position by a system of grids placed within the fuel element casing in such a manner as to determine the respective distances between fuel-plate units. A fuel element as thus constituted is particularly advantageous in reactors of the light-water type.

The above-mentioned fuel element which is fabricated from unitary fuel wafers hooped individually by means of a thin metallic strip can be constructed in accordance with the invention in two different ways.

In some cases, the thin metallic strip is constituted by two strip components which are bent in the shape of a U, said components being fitted one inside the other along the sides of the wafer and secured by welding at separate points, for example by the known spot-welding technique.

In other cases, the thin metallic strip is formed by winding at least one turn of metallic ribbon around the lateral perimeter of the wafer, said metallic ribbon being of small thickness within the range of 0.05 to 0.2 mm, for example.

As in the first mode of execution, the metallic protection of each wafer of fuel material is preferably provided by one of the metals usually selected for cladding the fuel elements of water reactors, that is to say zirconium and its alloys, for example. The metallic strip thus employed for the purpose of hooping the wafers of ceramic fuel material has a variable but relatively small thickness within the range of 0.1 to 0.5 mm, for example.

When the thin metallic strip is formed by means of U-shaped strip components, said components can be fitted one inside the other in two different ways. Thus, either the arms of one strip component or outer component completely cover the arms of the other strip component or inner component or, on the contrary, each strip component has an inner arm and an outer arm.

In accordance with one characteristic feature of the invention, the ceramic fuel material is uranium dioxide and the cladding material is selected from the group comprising zirconium and the zirconium alloys; the metallic partition-strips are also formed of identical material.

In accordance with another characteristic feature of the invention, the ceramic fuel material is loaded with a burnable neutron poison in order to compensate for the drop in reactivity during the lifetime of the reactor.

The method of fabrication of a nuclear fuel plate in accordance with the invention essentially comprises the construction of ceramic nuclear fuel wafers protected individually by independent cladding, the positioning between two metallic cladding plates of a layer of said fuel wafers placed within a metallic frame, then the diffusion bonding of the complete assembly thus obtained under pressure and at high temperature.

In an alternative embodiment of the invention, thin metallic partition-strips each forming a separation between two adjacent fuel wafers are placed between said wafers at the time of assembly.

In accordance with a characteristic feature of the method which forms the subject of the invention, the diffusion bonding operation is performed while maintaining the assembly thus obtained at a temperature in the vicinity of 830° C under a pressure of the order of 1000 bars for a period of approximately 4 hours. During the operation just mentioned, the metallic frame, the individual and independent protection means and the two top and bottom metallic cladding plates fuse together to form a single piece, thus encapsulating the unitary fuel wafers within separate and independent compartments which are perfectly isolated from each other.

The metallic cladding plates can be either flat or curved along their lateral edges and are always welded so as to enclose the assembly of plates in leak-tight manner prior to the aforesaid diffusion bonding operation.

The properties of the invention will be more particularly brought out by the following description which is given by way of example and not in any limiting sense, reference being made to the accompanying drawings, wherein.

Figure 1:
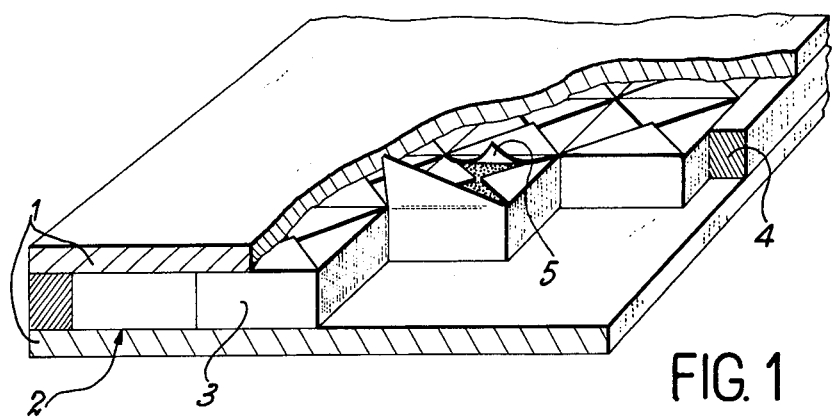
FIG. 1 illustrates a fuel plate in accordance with the invention.

The fuel plate which is illustrated in FIG. 1 comprises two external cladding plates 1 and a central layer 2 formed by a plurality of fuel wafers 3 arranged in several rows so as to cover the surface of the fuel plate while nevertheless leaving lateral clearance spaces. Said lateral spaces are taken up by a metallic frame 4 which surrounds the assembly of fuel wafers 3. The fuel wafers 3 are separated from each other by sheets 5 of metallic foil which serve to wrap each fuel wafer 3 and form the partitions which isolate the fuel compartments.

Figure 2:
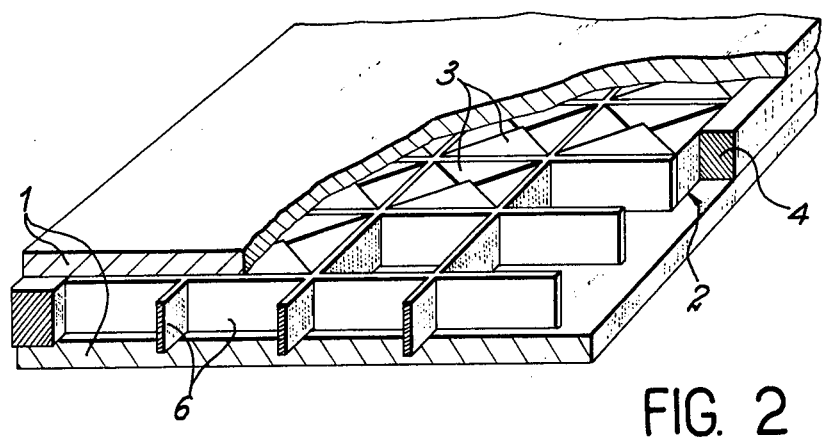
FIG. 2 illustrates an alternative form of said fuel plate which is fitted with partition-strips.

Referring now to FIG. 2 which illustrates an alternative form of construction of a fuel plate in accordance with the invention, there are again shown the external cladding plates 1 and the central layer 2 formed by the fuel wafers 3 which are arranged in a number of rows. In this example, metallic partition strips 6 are interposed between the adjacent fuel wafers and serve to reinforce the partitions of the fuel compartments containing the wafers 3.

Figure 4:
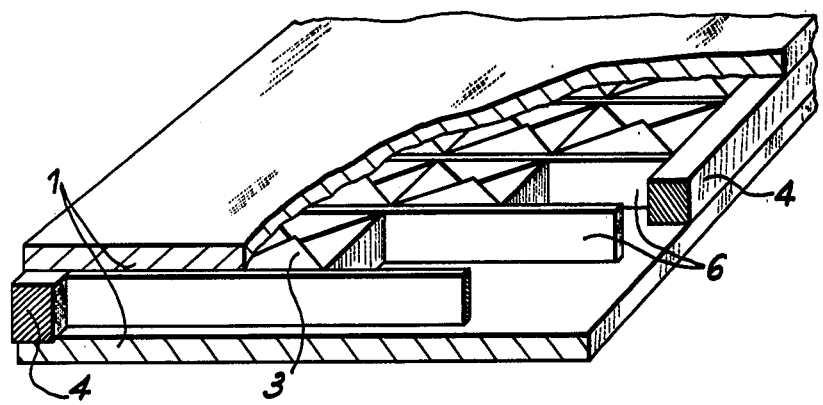
FIG. 4 illustrates a second alternative form of said fuel plate in accordance with the invention.

In the case of FIG. 2, said metallic partition-strips 6 are disposed on a lattice having two perpendicular directions whereas on the contrary, in the mode of execution shown in FIG. 4, all the metallic partition-strips 6 are parallel and extend along the entire length of the fuel plate.

The method of fabrication of a fuel plate as illustrated in FIG. 1 will now be described by taking as a non-limitative example the case of a zircaloy plate containing a fuel having a base of enriched uranium oxide. The method first consists in providing wafers of square cross-section and having a thickness of 9 to 4 mm, said wafers being formed of sintered uranium oxide having a density of approximately 10.3. After passing out of the sintering furnace, said wafers are first covered with a layer of graphite which constitutes an anti-diffusion barrier in order to prevent the zircaloy-UO$_2$ reaction, deposition of said graphite layer being carried out by any known method such as deposition of pyrolytic graphite from a gaseous phase, the Aquadag processes and the like.

Said fuel wafers are then wrapped in a sheet of ductile zirconium foil having a thickness of approximately 0.05 to 0.1 mm in a manner which can be likened to a toffee.

Figure 3:
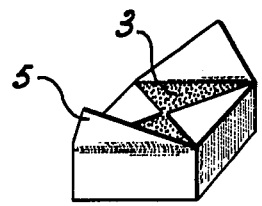
FIG. 3 illustrates a unitary fuel wafer.

FIG. 3 shows the fuel wafer 3 which is placed on the sheet 5 of zirconium foil. By folding back the corners of said sheet 5, the wafer is thus wrapped in much the same fashion as a toffee. The next operation consists in assembling these wrapped wafers on a support plate of zircaloy having a thickness of 0.40 mm and constituting one of the fuel element cladding plates 1. The wafers 3 are laid side by side, thus forming rows so as to cover the surface of the cladding plate except for the edges of the plate 1 which are left free and along which are placed the zirconium members 4 which have a substantial length and a thickness of 4 mm, said members being intended to form a frame which surrounds the fuel wafers. The assembly thus obtained is covered by a zircaloy plate 0.40 mm in thickness which constitutes the other cladding plate of the fuel element. The cladding plates and the frame which surround the fuel core are then welded in vacuo so as to close the fuel element and ensure that the fuel wafers are maintained in position within the cladding.

The final step of the method concerns the rigid interassembly of the complete structure so as to form the metallurgical bonds between the fuel element cladding plates 1, the fuel 3 contained in each compartment and the sheets 5 of metallic foil which delimit these compartments.

The above-mentioned operation is performed by diffusion bonding, the entire assembly being maintained for a period of 4 hours at a temperature of 830° C in a gaseous atmosphere such as halium under a pressure of 1000 bars.

The method of fabrication of the fuel plate illustrated in FIG. 2 is wholly similar.

The starting material consists of fuel wafers which are covered and then wrapped like toffees in ductile zirconium foil. These wrapped wafers are then assembled on one of the zircaloy support plates 1 which constitute the cladding plates of the fuel element by interposing between the fuel wafers metallic partition-strips 6 having the same thickness as the wafers so as to reinforce the partitions of the fuel compartments. The metallic partition-strips are of two types. Both types have the same width and the same thickness but differ in length. The first type has a length equal to one side of a fuel wafer in the case of wafers of square cross-section. The second type has a length equal to the total length of the fuel plate. The first row of fuel wafers is formed on the zircaloy support plate by placing thereon in alternate sequence a fuel wafer 3 and then a zircaloy partition-strip 6 of the first type. When this row is completed, a zircaloy partition-strip 6 of the second type is placed along said row and the second row is then formed in the same manner as the first, the operations being continued so as to cover the surface of the cladding plate. The entire assembly is covered by the second cladding plate, whereupon closure of the fuel plate unit and bonding of the complete structure are performed in the same manner as before.

It is wholly apparent that this example of assembly of fuel wafers and metallic partition-strips is not given in any sense by way of limitation and that other types of assemblies can be employed while remaining within the scope of the present invention. In particular, the fuel wafers can have any geometrical shape provided that their juxtaposed assembly serves to constitute a fuel surface which does not have any vacant spaces.

Figure 5:
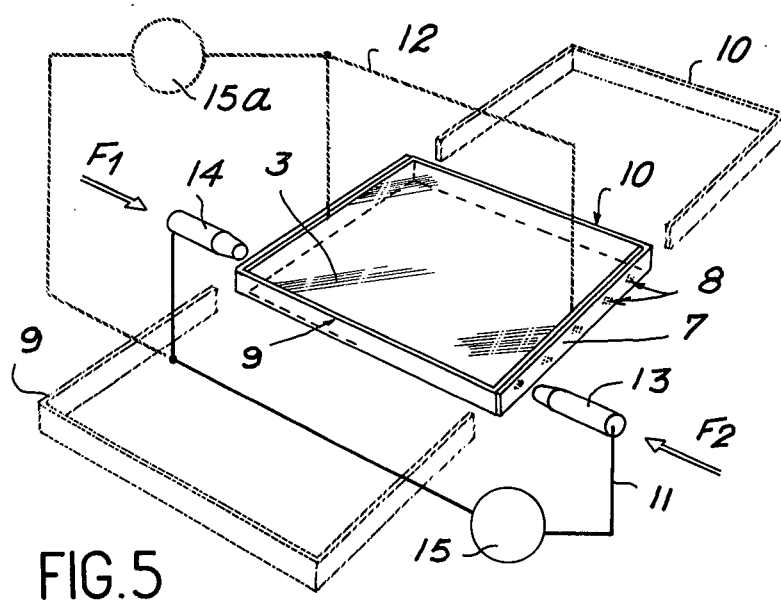
FIG. 5 illustrates a wafer of fuel material and the two strip components which are bent in the shape of a U and are intended to form the lateral cladding of the wafer whilst

There is shown in FIG. 5 a wafer 3 of ceramic fuel material fitted in accordance with the second mode of execution of the invention with a protective metallic strip 7 of small thickness which is welded at a certain number of points such as the point 8. In the case of FIG. 5, the thin metallic strip is of zircaloy and has been formed by means of the strip components 9 and 10 having a thickness of 0.30 mm and bent in the shape of a U, said components being represented diagrammatically in the figure in dashed outline prior to interengagement around the wafer 3; FIG. 5 also shows in a highly diagrammatic form the electric welding circuits 11 and 12 and the electric generator 15 which are employed for the purpose of forming the spot welds 8 of the metallic strip 7 of the fuel wafer 3. In accordance with the invention, two different modes of execution of the interengagement of the U-shaped strip components can be adopted and are shown respectively in FIGS. 5a and 5b which do not show the wafers for the sake of enhanced simplicity of the drawing.

Figure 5A:
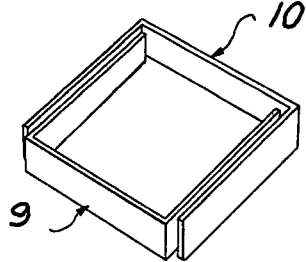
FIGS. 5a and 5b show two alternative forms of construction.

In the first form of construction shown in FIG. 5a, one of the two strip components, namely the inner component 9, is entirely covered by the other strip component, namely the component 10.

Figure 5B:
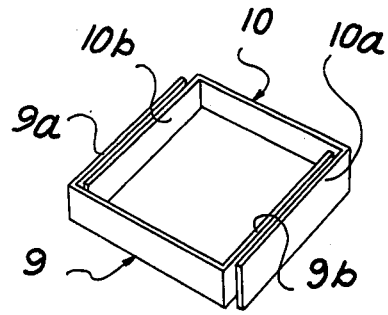

In the second form of construction shown in FIG. 5b, the strip component 9 and the strip component 10 each have an outer arm 9a and 10a and an inner arm 9b and 10b.

In the first mode of execution of the method, the electrodes 13 and 14 are aligned along the arrows F1 and F2 so as to apply a compressive force on the lateral walls 7 of the wafer 3. In the example herein described, said force of application which is necessary in order to reduce the contact resistance between the two strip components 9 and 10 and the effects of Joule heating in the outer strip component 10 (FIG. 5a) which short-circuits the two electrodes 13 and 14 is of the order of 14 kg. This mode of procedure has given the best results but a fairly high energy is required in order to take account of the fact that a substantial proportion of this energy is inevitably expended in short-circuit within one of the U-shaped strip components. On the other hand, it is possible by means of this procedure to make two simultaneous welds on the opposite sides of the two arms of each U and this represents an advantage.

In the second mode of execution of the method described with reference to FIG. 5, the electrical circuit is shown in dashed lines and the generator is shown in 15a. The electrodes 13 and 14 are again applied against the lateral walls of the fuel wafer 3 in oppositely-facing relation to each other so as to exert requisite compressive force; however, the two electrodes 13 and 14 are brought to the same potential and the supply of current is effected through a circuit 12 which is connected electrically to the lateral arms of the inner U-shaped strip component. The electrical connection may be established by means of a copper strip, for example.

The advantage of this alternative form lies in the fact that a result which is similar to the preceding is obtained with lower electric power and a lower compressive force since the short-circuit problems no longer arise by virtue of the arrangement of the strip components as shown in FIG. 5b; on the other hand, the industrial application of this embodiment on a large scale is clearly a matter of greater difficulty.

Figure 6:
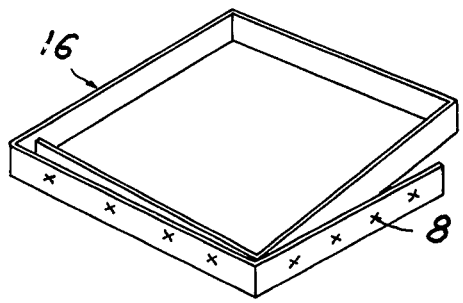
FIG. 6 illustrates a thin metallic ribbon which is folded-back against itself and intended to provide a lateral covering for a wafer of fuel material.

In the case of FIG. 6, the wafer of ceramic fuel material has been omitted for the sake of enhanced visibility of the drawing in which there is simply shown the zircaloy strip 16 which is folded and wound around itself. Once it has been wound so as to surround the wafer of fuel material, said strip is in turn welded at a certain number of points such as the point 8 as in the previous example. In the example of FIG. 6, the thin metallic strip which constitutes the lateral cladding of the wafer has a thickness of the order of 0.2 mm.

Figure 7:
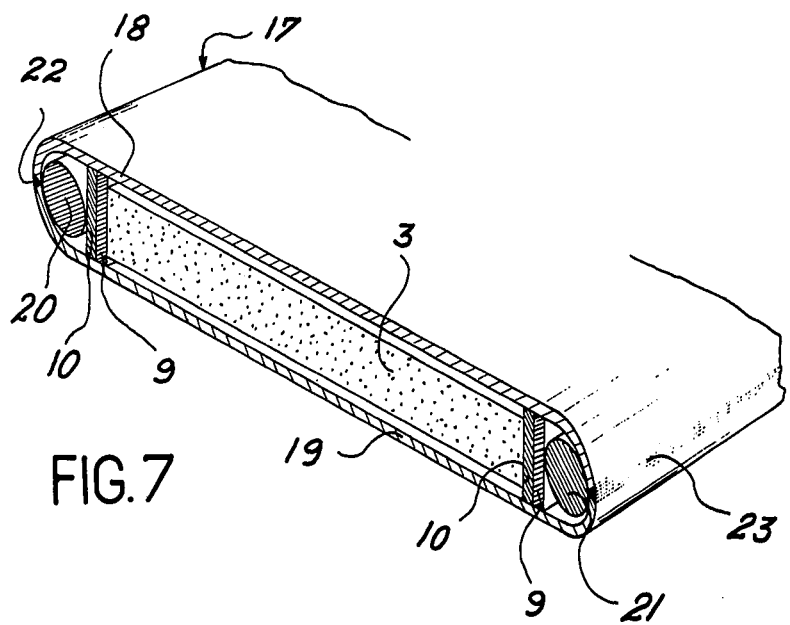
FIG. 7 is a diagrammatic sectional view of a portion of fuel element in the form of a narrow plate unit of substantial length and constituted by a single row of fuel wafers prior to cladding.
Figure 8:
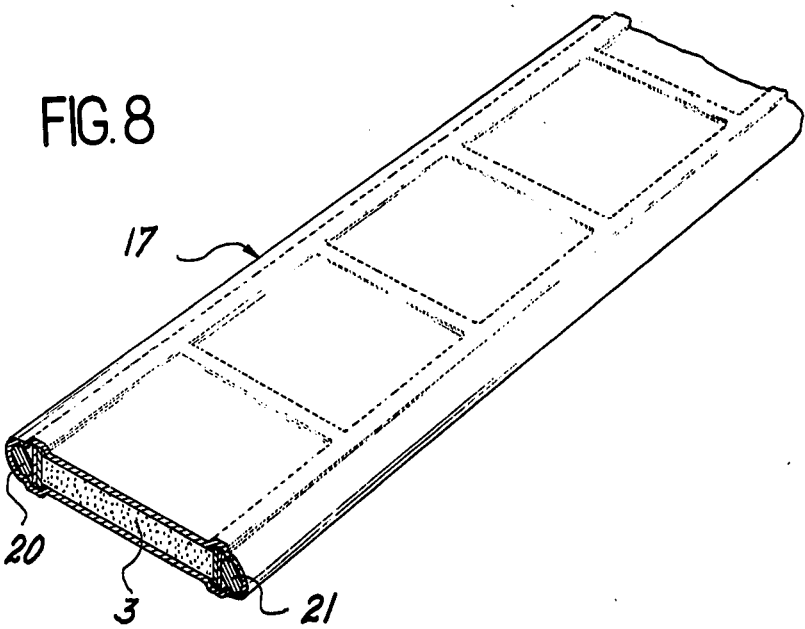
FIG. 8 is a partial view showing a narrow plate unit in accordance with the design shown in FIG. 3 but after completion of the cladding operation.

In FIG. 7, there is shown in cross-section a fragment of a fuel element plate unit 17 formed by assembling together a single row of ceramic fuel wafers such as the wafer 3 which are fitted with their independent covering-strip components 9 and 10 and which are intended to be clad by two zircalogy plates, namely a top plate 18 and a bottom plate 19. To this end, the plates 18 and 19 have curved extremities so as to enclose two zircaloy wires 20 and 21 which extend along the entire length of the plate unit. The assembly being thus completed, the cladding plates 18 and 19 are welded along their entire junction lines, namely along the two lines 22 and 23, for example by means of the electronic beam welding process. Finally, cladding by diffusion bonding at high temperature and under pressure effects the leak-tight assembly of the different elements. The final product obtained as shown in FIG. 8 is a fuel element plate unit 17 entirely clad with zircaloy in which each wafer of ceramic fuel material is clad within a unitary compartment. Fuel element plate units of this type can very advantageously be employed in fuel assemblies each consisting of a large number of these narrow plate units which are maintained by the spacer grids of a fuel element casing; these fuel assemblies are employed in particular as fuel elements in nuclear reactors of the water-cooled type.

What we claim is:

1. A plate-type nuclear fuel element comprising a core having a base of ceramic fuel material enclosed between two metallic cladding plates, wherein the fuel core is constituted by the juxtaposed array of a plurality of thin wafers of a ceramic fuel material, said wafers each having a geometric shape such that their planar juxtaposed assembly serves to form said plate-type nuclear fuel element which does not have any vacant spaces, at least a number of said wafers being provided with an individual metallic protection constituted by covering at least the lateral perimeters of said wafers with a thin metallic covering prior to assembly of said wafers to form said plate-type nuclear fuel element, said thin metallic covering having a contributory function in the assembly of cladding the wafers and dividing said plate-type nuclear fuel element into compartments.

2. A fuel element according to claim 1, wherein the protection of each wafer of ceramic fuel material is provided laterally by means of a thin metallic strip.

3. A fuel element according to claim 2, wherein the thin metallic strip has a thickness within the range of 0.1 to 0.5 mm.

4. A fuel element according to claim 2, wherein the thin metallic strip is constituted by two strip components bent in the shape of a U, said components being fitted one inside the other along the sides of the wafer and secured by spot welds.

5. A fuel element according to claim 2, wherein the thin metallic strip is formed by winding at least one turn of metallic ribbon around the lateral perimeter of each wafer, said metallic ribbon being of small thickness within the range of 0.05 to 0.2 mm.

6. A fuel element according to claim 1, wherein the individual protection of each wafer is provided by means of a sheet of thin metallic foil which completely surrounds said wafer.

7. A nuclear fuel element according to claim 6, wherein metallic partition-strips are interposed between the protected fuel wafers in such a manner as to ensure that two adjacent fuel wafers are separated by the whole or a part of a metallic partition-strip.

8. A nuclear fuel element according to claim 6, wherein any two adjacent rows of protected fuel wafers are separated by a metallic partition-strip which extends along the entire length of said element.

9. A fuel element according to claim 1, wherein the framed wafers of fuel material are aligned in a single row so as to form a narrow plate unit of substantial length between two top and bottom metallic cladding plates.

10. A fuel element according to claim 1, wherein the material constituting the independent and individual covering of each wafer is selected from the group comprising zirconium and the zirconium alloys.

11. A nuclear fuel element according to claim 1, wherein the ceramic fuel material is uranium dioxide.

12. A fuel element according to claim 1, wherein the ceramic fuel material is loaded with a burnable neutron poison.

13. A fuel element according to claim 1, wherein the cladding material is selected from the group comprising zirconium and the zirconium alloys.

14. A fuel element according to claim 7, wherein the metallic partition-strips are formed of material which is identical with that of the fuel element cladding.

* * * * *